3,661,833
FAST CURING ORGANOSILOXANE RESINS
Willard D. Larson, Midland, Mich., assignor to Dow Corning Corporation, Midland, Mich.
No Drawing. Filed July 9, 1970, Ser. No. 53,628
Int. Cl. C08f 45/30
U.S. Cl. 260—33.8 SB    8 Claims

ABSTRACT OF THE DISCLOSURE

Curable fluorosilicone resins are disclosed. Such resins consist of a random organosiloxane resin base having a degree of substitution from 0.95 to 1.7 inclusive, the organic substituents being monovalent hydrocarbon or monovalent halohydrocarbon radicals, at least 70 mol percent of these substituents being 3,3,3-trifluoropropyl radicals, curability resulting from termination of the resin base with monoorganodihydroxylsiloxy units, monomethyldihydroxylsiloxy units being present in amounts in the range of from 0.05 to 0.5 moles per 100 grams of the random organosiloxane resin base. The curable fluorosilicone resins can be used as molding compositions, laminating resins, coatings and varnishes.

---

This invention relates to fluorosilicone resins which are fast curing and to a method for preparing the same.

Organosiloxane resins are prepared by hydrolysis methods well known in the art. These hydrolysis methods generally utilize chlorosilanes which are hydrolyzed by addition to water. If desired the hydrolysis can be carried out in suitable organic solvents, such as toluene, xylene and alcohol, among others. Other silanes have also been used to provide organosiloxane resins, for example alkoxy and acetoxy silanes can be easily hydrolyzed. The silane starting material can be a single silane or mixtures of silanes, including $SiX_4$, $RSiX_3$, $R_2SiX_2$ and $R_3SiX$ in which R is a monovalent organic radical bonded to the silicon atom through a silicon-carbon bond and X is a hydrolyzable group such as a halogen atom, alkoxy radicals or acetoxy radicals. Organosiloxane resins are generally defined as those materials in which the R/Si ratio (degree of substitution) is less than 1.9.

In the preparation of organosiloxane resins, the hydrolysis of the silanes to silanols is followed, in most cases, by spontaneous condensation of the silanols to form siloxane linkages. This is particularly true in the case of chlorosilanes since the hydrolysis produces hydrochloric acid which catalyzes the condensation. The condensation is not complete because the silicon-bonded hydroxyl radicals which are last to form during hydrolysis are most stable toward condensation. This results in a hydroxy-functional resin which is soluble in organic solvents. Generally, the hydroxyl content is in the range of 1 to 10 weight percent of the resin. The condensation of the residual silicon-bonded hydroxyl radicals is known as curing and requires a catalyst and high temperatures. The time for such curing can be for a few minutes up to several hours depending upon the resin composition.

The number of and nature of organic radicals bonded to the silicon atom have a direct effect upon the stability of a hydrozyl group bonded to that silicon. For example, it is known that the rate of hydrolysis decreases with an increase in the number of organic radicals bonded to the silicon atom. Eaborn, in "Organosilicon Compound," Butterworths Scientific Publications, London, 1960, shows that silicon-bonded hydroxyl groups are more stable with increasing molecular weight of the organic groups attached to the silicon atom through a silicon-carbon bond. Organosiloxane resins containing large amounts of 3,3,3-trifluoropropyl substituted silicon atoms cannot be cured in the conventional sense. This lack of ability to cure is thought to result from the stability of the residual silanols and may also result, in part, from the formation of large amounts of cage-like silsesquioxane structures which provide stearic hindrance to condensation and reduce the number of residual silanols. Whatever the theoretical considerations may be, there are no resins containing or major amount of trifluoropropyl substituents available which cure under any practical conditions.

Thus, it is an object of the invention to provide curable fluorosilicone resins.

It is another object of the present invention to provide a method for preparing fluorosilicone resins which have easily condensed silicon-bonded hydroxyl radicals.

These and other objects of the invention will be apparent to one skilled in the art upon consideration of the following disclosure and claims.

In accordance with the invention, there are provided organosiloxane resins consisting essentially of a random organosiloxane resin base having a ratio of organic radicals to silicon atoms of from 0.95 to 1.7 inclusive, the organic radicals (R) being selected from the group consisting of monovalent hydrocarbon and monovalent halohydrocarbon radicals, at least 70 mol percent of the organic radicals being 3,3,3-trifluoropropyl radicals, the random organosiloxane resin base being terminated by monoorganodihydroxysiloxane units of the formula $$R'(HO)_2SiO-$$

in which R' is selected from the group consisting of alkyl radicals of from 1 to 6 carbon atoms, the vinyl radicals, the phenyl radical and the 3,3,3-trifluoropropyl radical; at least 75 mol percent of the units being $CH_3(OH)_2SiO-$ units, the monomethyldihydroxysiloxy units being present in an amount in the range of 0.05 to 0.5 mole per 100 grams of resin base; the random organosiloxane resin base being substantially free of silicon-bonded hydroxyl groups other than the defined dihydroxysiloxy units.

For purposes of the present invention, a random organosiloxane resin is any homopolymer or copolymer prepared by conventional prior art methods without regard to the final organosiloxane structure, such as by hydrolysis of a mixture of chlorosilanes. The hydrolyzate can be neutralized if desired. These resins serve as the base material for the improved resins of the present invention.

The random organosiloxane resins most suitable for use are those which have 1 to 8.5 weight percent silicon-bonded hydroxyl radicals, preferably having from 2 to 5 weight percent. The organic radical bonded to the silicon atoms through the silicon-carbon bonds in the random organosiloxane resin base can be any monovalent hydrocarbon radical or halogenated hydrocarbon radical so long as at least 70 mol percent of the organic radicals are the requisite 3,3,3-trifluoropropyl substituents.

As described above the organic radicals (R) can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-monenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as cyclobutyl, cyclopentyl, cyclohexyl, cycloheptyl, propylcyclohexyl, 2,4-dimethylcyclopentyl, cyclohexenyl, bicyclo {3.1.0} hexyl, tricyclo-{3.2.1.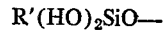}-5-nonenyl, spiro {4.5} decyl, dispiro {4.1.4.2}-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-penyl-octyl, 3-methyl-2(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

The organic radicals can also include monovalent halogenated hydrocarbon groups such as aliphatic groups such as chloromethyl, 3-chloropropyl, perfluorovinyl, chlorooctadecyl or radicals of the formula $R_fCH_2CH_2—$ where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, $\alpha,\alpha,\alpha$-trifluorotolyl or iodonaphthyl; cycloaliphatic groups such as chlorocyclohexyl, bromocyclopentyl or chlorocyclohexenyl and aralkyl groups such as chlorobenzyl, $\beta$-(chlorophenyl)ethyl or $\beta$-(iodophenyl)ethyl or $\beta$-(bromophenyl)propyl. The preferred R substituents, both hydrocarbon and halohydrocarbon, are those of from 1 to 18 inclusive carbon atoms, especially methyl and phenyl radicals.

The random organosiloxane resin can include any combination of monoorganosiloxane units, diorganosiloxane units, and $SiO_2$ units so long as the ratio of organic radicals per silicon atom is within the defined limits of from 0.9 to 1.7. A degree of substitution (R/Si ratio) of from 1 to 1.6 is preferred in the base resin. When a random organosiloxane resin is a homopolymer it is, of necessity, composed of only organosiloxane units wherein the organic radicals are 3,3,3-trifluoropropyl radicals. Copolymeric random organosiloxane resins can be composed of various combinations of the stated siloxane units.

To obtain the curable resin of the invention, the random organosiloxane base resin is reacted with silanes of the formula $R'SiX_3$ in which R' is as defined above and X is selected from the group consisting of the chlorine atom or the acetoxy radical. The preferred silanes are methyltriacetoxysilane and methyltrichlorosilane. Mixtures of the preferred silanes with one or more of 3,3,3-trifluoropropyltriacetoxy- or trichlorosilane, vinyltriacetoxy- or vinyltrichlorosilane or ethyltriacetoxy- or ethyltrichlorosilane and phenyltriacetoxy or phenyltrichlorosilane can be used provided that the mixture contains at least 75 mol percent of methyltriacetoxy- or methyltrichlorosilane. Of course mixtures of the triacetoxy and trichlorosilanes can be utilized. A mixture of the silanes is used when it is desirable to achieve some specific cure time for the resin which is slower than that obtained with methyltriacetoxy- or methyltrichlorosilane alone.

The organosilane is added to the random resin in an amount sufficient to provide from 1.0 to 1.1 inclusive mols of the organosilane per silicon-bonded hydroxyl radical of the random organosiloxane base resin thus ensuring that substantially all of the residual hydroxyl groups of the base resin will be reacted and providing the described limits of 0.05 to 0.5 mol of monomethyldihydroxysiloxy units in the resins of the invention. Preferably a 1—1 ratio is utilized. It is preferred that the random organosiloxane resin base have a silicon-bonded hydroxyl content sufficient to provide after reaction, a monomethyldihydroxysiloxy content of 0.1 to 0.25 mols per 100 grams of resin.

The mixing of the silanes and base resin is accomplished in a polar organic solvent for the random organosiloxane resin. Suitable polar organic solvents include methylene chloride, diethylether, chlorothene, tetrahydrofuran and butylacetate. The organic solvent contains at least 20 weight percent of the base resin and preferably contains 40 weight percent or more of the resin. Methylene chloride is the preferred solvent.

The mixture of random organosiloxane resin and the organotriacetoxy- or organotrichlorosilane is allowed to react for at least 30 minutes at room temperature. The length of reaction time is not critical after the first 30 minutes. The temperature need not be held at room temperature but can be increased up to and including the boiling point of the solvated system. Increasing the temperature will permit faster reaction and thus shorter times can be employed, but at least 5 minutes reaction time should be allowed to ensure completion of the reaction of the residual hydroxyls on the base resin with either the chlorine groups or acetoxy groups of the silane. The result of this reaction is to replace all of the stable residual hydroxyl groups which are difficult to condense with reactive organoacetoxy- and/or organochlorosiloxane units.

The reaction product, a random organosiloxane resin terminated with organodiacetoxy- or organodichlorosiloxane units, is then reacted with sufficient water to hydrolyze all of the acetoxy or chloro groups. Preferably, a molar excess of water is added to the solution of modified base resin in order to obtain complete hydrolysis and provide a maximum amount of reactive silicon-bonded hydroxyl radicals in the final product. An acid-acceptor, such as a tertiary amine, can be added to prevent the acid by-product from catalyzing silanol condensation and causing premature gellation. After addition of the water, the mixture is agitated for at least 5 minutes at room temperature to allow complete hydrolysis. The maximum time that the mixture is agitated can vary broadly. Preferably the mixture is agitated from 10 minutes to 1 hour. When agitation is terminated the mixture forms an aqueous phase and an organic solvent product phase. The phases can be separated by conventional techniques, such as decanting. The organic solvent phase is then azeotroped to remove any residual water and by-products.

The product thus obtained is a fast curing fluorosilicone resin containing at least 0.05 mole of monomethyldihydroxysiloxy units per 100 grams of resin. It has been found that if less than this amount is formed, the resin does not cure under conventional conditions. The resins of the present invention have a faster curing time than the starting random organosiloxane resin which for all practical purposes does not cure. For example, heating the fast cure resin of the invention will result in condensation and curing in a very short time, for example, 5 minutes, while heating the random organosiloxane resin used in its preparation at temperatures of 250° C. for over 100 minutes does not result in any indication of cure. Any of the conventional silanol condensation catalysts, such as metal salts, amines, and the like can be used in curing the organosiloxane resins of the invention. It is to be noted, however, that these fast curing resins will condense by the action of heat alone.

The fast curing fluorosilicone resins are useful in most commercial application where organosiloxane resins are utilized, such as in making laminates and in the manufacture of paints, as release coatings, as coil coatings and as molding compositions.

The following examples are illustrative and should not be construed as limiting the invention which is delineated in the claims.

EXAMPLE 1

A mixture of 120 grams of 3,3,3-trifluoropropyltrichlorosilane and 34 grams of 3,3,3-trifluoropropylmethyldichlorosilane in 75 grams of methylene chloride was added to a mixture of 75 grams of methylene chloride and 150 grams of water. The silane mixture was added at a rate sufficiently slow so that the reaction temperature did not rise above 35° C. Stirring of the reaction mixture was continued for about 30 minutes after the addition was complete. An aqueous and organic solvent product phase were allowed to form and the phases were then separated by decanting. The hydrolyzate was washed acid free using a small amount of ammonia in the final wash. The solvent was stripped from the product under vacuum conditions to yield a random fluorosiloxane resin having 3.53% ≡SiOH content. This resin can be considered a random organosiloxane base resin as discussed above. The resin failed to gel after 100 minutes exposure to temperatures of 250° C. indicating its inability to cure or condense the silicon-bonded hydroxyl groups by means of heat.

A mixture of 15.1 grams CH₃SiCl₃ (1 mole/≡SiOH) and 14.2 grams of pyridine (acid acceptor) was added to the base resin. A strong exotherm was observed. The reaction mixture was stirred 30 minutes.

The resulting methylchlorosiloxanes terminated resin was then reacted with 18 grams of water. This hydrolysis reaction was carried out at room temperature while stirring for about 30 minutes. The hydrolyzate was washed free of the hydrochloric acid by-product, azeotroped and stripped of remaining solvent. The product was a random trifluoropropylsiloxane resin composed of 63 mol percent of monotrifluoropropylsiloxane units and 36 mol percent of 3,3,3-trifluoropropylmethyl siloxane units, terminated by dihydroxy bearing monomethylsiloxane units.

Sufficient toluene-ether mixture was added to the product to form a solution containing 45.8 weight percent of the resin. This solution had a viscosity of 11 cs. The resin product had a gel time at 250° C. of 1 minute and 40 seconds as compared to the failure to cure at 250° C. after 100 minutes of the base resin. Weight loss of the resin after 24 hours at 200° C. was 4.85 percent.

EXAMPLE 2

A mixture of 1109 grams (4.8 moles) of 3,3,3-trifluoropropyltrichlorosilane, 338 grams (1.6 moles) of 3,3,3-trifluoropropylmethyldichlorosilane and 64 grams (0.4 mole) of vinyltrichlorosilane in 500 mls. of methylene chloride was added to a mixture of 500 mls. of methylene chloride and 2000 mls. of distilled water. The silane mixture was added while stirring and the receiving flask was externally cooled. After addition was complete the hydrolysis mixture was stirred for two hours and then washed free of acid. The solvent was azeotroped to obtain an 80% solids solution of the random organosiloxane resin base which consisted of CF₃CH₂CH₂SiO₃/₂ units CF₃CH₂CH₂(CH₃)SiO units and CH₂=CHSiO₃/₂ units and had a ≡SiOH content of about 2 weight percent. A sample of this random resin failed to gel or give other indications of curing after being maintained at 250° C. for greater than 100 minutes.

A mixture of 264 grams (1.2 moles) of methyltriacetoxy and a small amount (20 drops) of pyridine was added to the hydrolyzate solution and allowed to react for 30 minutes at room temperature to form the methyldiacetoxysiloxane-terminated resin base. This terminated resin base was hydrolyzed by the addition of 65 grams of water to obtain the resin of the invention which contained about 0.1 mol of methyl dihydroxysiloxy terminal units per 100 grams of resin. The reaction mixture was washed free of acid, stripped of methylene chloride and then diluted back to a 55% solids concentration. This resin had a gel time of 5 minutes at 250° C.

That which is claimed is:

1. An organosiloxane resin consisting essentially of a random organosiloxane resin base having a ratio of organic radicals to silicon atoms of from 0.95 to 1.7 inclusive, the organic radicals being selected from the group consisting of monovalent hydrocarbon radicals and monovalent halohydrocarbon radicals, at least 70 mol percent of the organic radicals being 3,3,3-trifluoropropyl radicals, the random organosiloxane resin base being terminated by monoorganodihydroxysiloxy units of the formula R'(OH)₂SiO— in which R' is selected from the group consisting of alkyl radicals of from 1 to 6 inclusive carbon atoms, the vinyl radical, the phenyl radical and the 3,3,3-trifluoropropyl radical, at least 75 mole percent of the units being CH₃(OH)₂SiO— units, the monomethyldihydroxy siloxy units being present in an amount in the range of from 0.05 to 0.5 mole per 100 grams of the random resin base; said random organosiloxane resin base being substantially free of silicon-bonded hydroxyl groups other than said dihydroxysiloxy units.

2. The organosiloxane resin of claim 1 wherein the random organosiloxane resin base contains organic radicals selected from the group consisting of monovalent hydrocarbon radicals of from 1 to 18 carbon atoms and monovalent halohydrocarbon radicals of from 1 to 18 carbon atoms.

3. The organosiloxane resin of claim 2 wherein the random organosiloxane resin base contains only methyl and 3,3,3-trifluoropropyl radicals.

4. The organosiloxane resin of claim 2 wherein all of the monoorganodihydroxysiloxy units are CH₃(OH)₂SiO— units.

5. The organosiloxane resin of claim 2 wherein the random organosiloxane resin base contains from 1 to 1.6 organic radicals per silicon atom.

6. The organosiloxane resin of claim 2 wherein the monomethyldihydroxylsiloxy units are present in an amount in the range of from 0.1 to 0.25 mole per 100 grams of random resin base.

7. A solution of the organosiloxane resin of claim 1 containing at least 40 percent by weight, based on the weight of the solution, of a polar solvent for the organosiloxane resin.

8. The solution of claim 7 wherein the solvent is methylene chloride.

References Cited

UNITED STATES PATENTS

| | | | |
|---|---|---|---|
| 3,453,232 | 7/1969 | Larson | 260—46.5 |
| 3,489,782 | 1/1970 | Pruvost et al. | 260—448.2 |
| 3,032,529 | 5/1962 | Clark | 260—46.5 |
| 3,035,016 | 5/1962 | Bruner | 260—46.5 |
| 3,325,449 | 6/1967 | Ceyzeriat et al. | 260—46.5 |

DONALD E. CZAJA, Primary Examiner

M. I. MARQUIS, Assistant Examiner

U.S. Cl. X.R.

117—161 ZA; 260—30.4 SB, 31.2 R, 33.2 SB, 33.6 SB, 46.5 R, 46.5 G